US011952877B2

(12) United States Patent
Bruner

(10) Patent No.: US 11,952,877 B2
(45) Date of Patent: Apr. 9, 2024

(54) EJECTOR MANIFOLD AND SUBSURFACE PROCESS TO HARVEST LOW-PRESSURE NATURAL GAS

(71) Applicant: HAWK ENERGY SOLUTIONS, LLC, The Woodlands, TX (US)

(72) Inventor: Scott D. Bruner, The Woodlands, TX (US)

(73) Assignee: Hawk Energy Solutions, LLC, The Woodlands, TX (US)

( * ) Notice: Subject to any disclaimer, the term of this patent is extended or adjusted under 35 U.S.C. 154(b) by 41 days.

(21) Appl. No.: 17/854,969

(22) Filed: Jun. 30, 2022

(65) Prior Publication Data

US 2023/0012112 A1 Jan. 12, 2023

Related U.S. Application Data

(60) Provisional application No. 63/219,253, filed on Jul. 7, 2021.

(51) Int. Cl.

| | |
|---|---|
| ***E21B 43/18*** | (2006.01) |
| ***E21B 17/18*** | (2006.01) |
| ***E21B 43/12*** | (2006.01) |
| ***F15D 1/06*** | (2006.01) |

(52) U.S. Cl.

CPC .............. *E21B 43/18* (2013.01); *E21B 17/18* (2013.01); *E21B 43/129* (2013.01); *F15D 1/06* (2013.01)

(58) Field of Classification Search

CPC ...... E21B 43/18; E21B 43/124; E21B 43/129; F15D 1/06

See application file for complete search history.

(56) References Cited

U.S. PATENT DOCUMENTS

| | | | | |
|---|---|---|---|---|
| 2,080,622 A * | 5/1937 | McMahon | F04F 5/10 417/172 |
| 3,784,325 A | 1/1974 | Coanda et al. | |
| 5,095,977 A * | 3/1992 | Ford | G01N 17/046 422/53 |
| 5,228,839 A | 7/1993 | Peterson et al. | |
| 5,455,804 A | 10/1995 | Holmes et al. | |
| 7,878,270 B2 * | 2/2011 | Lee | E21B 43/305 166/380 |
| 8,215,392 B2 | 7/2012 | Rao | |
| 8,381,817 B2 | 2/2013 | Schultz et al. | |
| 9,890,628 B2 | 2/2018 | Sin et al. | |
| 10,301,905 B1 | 5/2019 | Schultz et al. | |

FOREIGN PATENT DOCUMENTS

| | | |
|---|---|---|
| JP | 2008019644 A | 1/2008 |
| WO | 2019147963 A1 | 8/2019 |

* cited by examiner

*Primary Examiner* — D. Andrews

(74) *Attorney, Agent, or Firm* — J. Andrew Reed; David W. Carstens; Carstens, Allen & Gourley, LLP

(57) ABSTRACT

A low-pressure natural gas harvesting system that injects motive fluid into a first well by a compressor, which flows into a motive manifold that utilizes the Coandă effect to introduce a reduced pressure effect. The reduced pressure effect draws natural gas into the system from natural gas reservoirs through one or more inflow ports that are part of inflow manifolds, which may connect to a motive manifold. The natural gas and motive fluid mix after the motive fluid flows over a Coandă effect surface and the mixture is subsequently directed to flow to a production well.

17 Claims, 6 Drawing Sheets

EJECTOR MANIFOLD AND SUBSURFACE PROCESS TO HARVEST LOW-PRESSURE NATURAL GAS

CROSS-REFERENCE TO RELATED APPLICATIONS

This application claims the benefit of U.S. Provisional Application No. 63/219,253, filed Jul. 7, 2021, entitled "Ejector Manifold and Subsurface Process to Harvest Low-Pressure Natural Gas," the disclosure of which is hereby incorporated by reference in its entirety.

BACKGROUND

Technical Field

The present disclosure relates to an ejector manifold system for harvesting low pressure natural gas. More particularly, and not by way of limitation, the present disclosure is directed to a system and method for using an ejector manifold system that utilizes the Coandă effect in horizontal lateral wellbores to harvest low pressure natural gas.

Background

This background section is intended to provide a discussion of related aspects of the art that could be helpful to understanding the embodiments discussed in this disclosure. It is not intended that anything contained herein be an admission of what is or is not prior art, and accordingly, this section should be considered in that light.

Many existing methods of extracting natural gas from hydrocarbon reservoirs utilize a pressure differential to encourage natural gas harvesting. One common approach utilizes the existing and higher pressure in the deposit to push the natural gas to a surface well. Alternatively, as reservoir pressure falls, a compressor will pull suction directly on a wellhead to pull the fluid to the surface as flow rates fall or cease. But for low pressure or near abandoned wells, these systems become inefficient.

Despite being abandoned, or near abandoned, these reservoirs still contain usable natural gas reserves that are a valuable resource that can be utilized. Without controlled extraction, the natural gas can leak to the surface over time through the aging and deteriorating wellbore systems and is potentially lost to the atmosphere. Current technology in the industry is insufficient to harvest the remaining low-pressure natural gas in these abandoned or near abandoned reservoirs; thus, the remaining low-pressure natural gas is currently unextractable despite its usefulness.

What is needed is a system that can successfully extract natural gas from abandoned, near abandoned, or low producing natural gas or other fluid deposits for harvest. It would be advantageous to have a system and method that overcomes the disadvantages of the prior art. The present disclosure provides such a system and method.

BRIEF SUMMARY

This summary provides a discussion of aspects of certain embodiments of the invention. It is not intended to limit the claimed invention or any of the terms in the claims. The summary provides some aspects but there are other aspects and embodiments of the invention that are not discussed here.

The present disclosure includes an ejector manifold system that utilizes the Coandă effect and method of use, which lowers the pressure in the manifold and encourages further natural gas production in abandoned, near abandoned, or low producing natural gas or other fluid deposit such as a hydrocarbon reservoir. The system can be utilized in existing or new wellbore systems.

The ejector manifold utilizes a high-pressure motive fluid compressor that delivers motive fluid into a well and transports the motive fluid through the subsurface and across the hydrocarbon reservoir. The motive fluid moves through a series of one or more inflow manifolds that allow for the inflow of natural gas into the manifold. The motive fluid then moves into a motive manifold over a Coandă effect surface that generates a further pressure differential between the low-pressure natural gas and the motive fluid, creating a reduced pressure effect that encourages natural gas to move into the inflow manifold through one or more inflow ports. A motive manifold is connected to each inflow manifold in such a way that the natural gas can move into the motive manifold unimpeded from an inflow manifold and subsequently entrain or mix with the motive fluid. The connection between each manifold and between each manifold and one or more pipes may be made through a variety of coupling methods, including compression coupling, soldering, and threading. The natural gas and motive fluid mixture is then evacuated to the surface for harvest through the same or different well. The motive fluid may move through an annular space that exists between the outer and inner concentric tubes that surround either one or both the inflow and motive manifolds. The inner and outer concentric tubes may be connected through devices such as inflow ports, splines, connectors, or more. The motive fluid may be encouraged to funnel through a motive manifold entrance into the motive manifold by a designed reduction in the annular space's cross-sectional area, which may persist throughout an upper section of a motive manifold. The motive manifold entrance may be an opening in the inner concentric tube or a channel that reaches from the annular space to the Coandă motive module. The inflow ports also extend through the annular space to the fluid deposit and blocks access of the motive fluid to the external natural gas reserve. One example of an inflow manifold includes three inflow ports separated laterally along the length of the inflow manifold and offset by 120 degrees from one another along the center axis of the manifold.

A motive manifold may include a Coandă motive module that contains the Coandă effect surface and possesses the ability to receive the motive fluid through a motive fluid entrance. The motive manifold may contain multiple Coandă modules or have multiple Coandă effect surfaces. The motive fluid entrance may extend throughout the entire circumference of the motive manifold or may be segmented throughout the circumference. The Coandă motive module separates the motive manifold into two segments: a lower section of the motive manifold and an upper section of the motive manifold. The lower concentric tube acts as a channel for the natural gas to flow to the connected Coandă motive module, where the natural gas encounters the motive fluid and subsequently entrains with the motive fluid through the upper concentric tube. In an initial manifold set the lower concentric tube can only contain natural gas. However, when the inflow manifold is utilized in combination with a motive manifold in subsequent sets there may be a mixture of motive fluid and natural gas at the second and subsequent inflow manifold stages and as a result into subsequent motive manifolds. Both tubes may have both the inner and outer concentric tubes to allow for motive fluid to flow in the annular space throughout the motive manifold.

In yet another example, the present disclosure allows for the ejection of motive fluid into a well that connects to a horizontal lateral wellbore containing one or more pairing of the inflow and motive manifolds. The wellbore may also contain individual inflow or motive manifolds that are not directly connected to one another. The horizontal lateral wellbore attaches to a vertical or near-vertical wellbore that evacuates the motive fluid and natural gas mixture to the surface. The vertical or near-vertical wellbore may contain one or more motive manifolds that contain the Coandă effect surface to help facilitate the movement of the mixture through a second well. The second well is attached to the compressor, which injects motive fluid into the vertical wellbore to further encourage mixture evacuation to the surface.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will be best understood by reference to the following detailed description of illustrative embodiments when read in conjunction with the accompanying drawings, wherein:

DETAILED DESCRIPTION

Embodiments of the present disclosure will now be described. Current natural gas harvesting systems only utilize inefficient means for drawing low-pressure natural gas from an abandoned, near abandoned, or low producing natural gas or other fluid deposit. The present disclosure is directed to the utilization of the Coandă effect within an ejector manifold system that generates a reduced pressure that is stronger than previous harvesting systems such that the ejector manifold system is more efficient at extracting remaining natural gas left in abandoned, near abandoned, or low producing natural gas or other fluid deposits. The ejector manifold system can be utilized in both horizontal and vertical well systems, or a combination of both types of well systems. In some examples, the reduced pressure may create an effect similar to a vacuum that encourages fluid movement towards an ejector manifold system, or apparatus.

The ejector manifold system, or apparatus utilizes an ejected fluid that, when allowed to flow over a Coandă surface, creates a localized decrease in pressure that encourages higher-pressure natural gas to flow towards the reduced pressure. Just downstream of the Coandă surface the motive fluid and the natural gas mix and entrain and the mixture flows to the surface for harvest. Once the ejection system is not able to extract any more natural gas, the reservoir is abandoned or near abandonment. A near abandoned well may be producing a rate that allows it to be near economically neutral for the well operator, but still returning a profit; i.e., does not cost them more to produce than the well will financially return.

Figure 1:
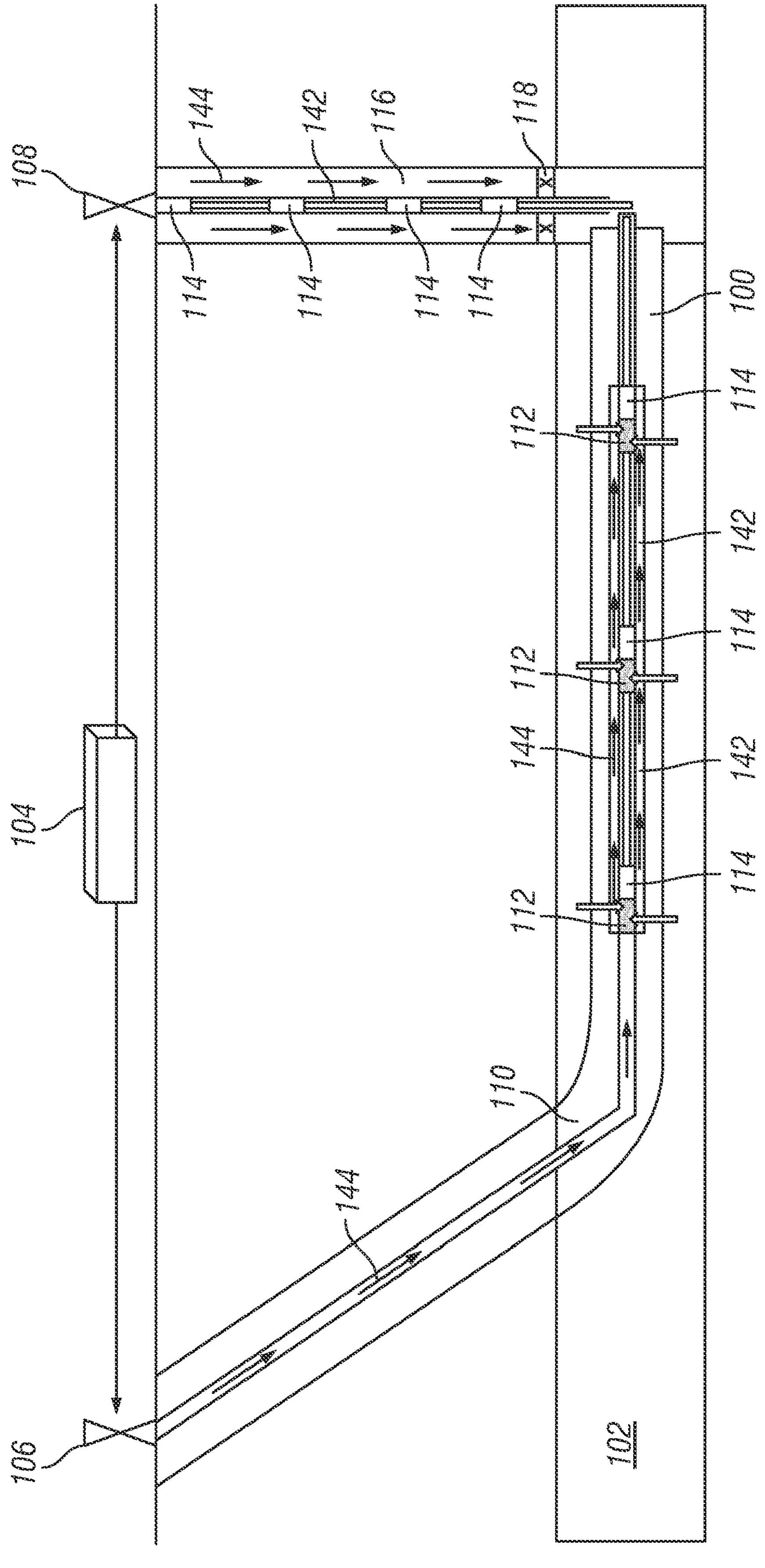
FIG. 1 is a schematic diagram of a low-pressure natural gas harvesting system.

FIG. 1 is a schematic diagram illustration of a low-pressure natural gas harvesting system, utilizing an ejector manifold system 100. The ejector manifold system 100 allows for abandoned, near abandoned, or low producing natural gas or other fluid deposits 102 to be drawn into one or more pipes 142 that engage with a motive or service well 106 and a production well 108. The ejector manifold system 100 can use a set of manifolds such as, but not limited to, inflow manifolds 112, motive manifolds 114, or booster manifolds (in some examples, the same as motive manifolds 114 but with a different set of operating parameters and a slightly different configuration), to provide a motive fluid 144 to the manifolds 112 and 114 to engage with the abandoned, near abandoned, or low producing natural gas or other fluid deposit 102 to pull and/or push the fluid to the surface through one or more pipes 142. The manifolds 112 and 114 may work in combination, utilizing a Coandă effect to generate a reduced pressure very near the abandoned, near abandoned, or low producing natural gas or other fluid deposit 102 to mobilize the fluid stored within the abandoned, near abandoned, or low producing natural gas or other fluid deposit 102.

As shown in FIG. 1, the ejector manifold system 100 can have a high pressure motive fluid compressor or other fluid supply 104 that compresses a motive fluid 144 for injection at a motive/service well 106 and/or production well 108. The motive fluid 144 moves through the wellbore 110, through inflow manifolds 112, and into the motive manifolds 114. In at least one embodiment, the wellbore 110 is a horizontal wellbore. Inflow manifolds 112 draw in natural gas from the reservoir via the reduced pressure created by the ejector manifold system, which then moves into directly connected motive manifolds 114. The manifolds 112 and 114 may be connected to one or more pipes 142 through a variety of couplings. These couplings can include, but are not limited to, threaded couplings, tongue and groove, dovetail, helical, friction fit, or other known types of couplings utilized to secure pipes or other fluid moving devices together. In at least one example, a removeable coupling is a threaded connection that may be a helical set of ridges and grooves similar in concept to a screw or bolt. The natural gas then mixes with the motive fluid 144 in the motive manifold 114 and moves through the other inflow and motive manifold pairs to the wellbore 116. In at least one example, the wellbore 116 is a vertical wellbore. The wellbore 116 receives compressed motive fluid 144 from production well 108, which encourages the mixture to move to the surface for harvesting. The encouragement allows for the harvesting system to provide lift to the surface. Wellbore 116 can optionally include a set of motive manifolds 114 or other ejector systems to further boost the movement of the mixture to the surface. A completion packer 118, which helps stabilize, seal, support, or protect the wellbore 116, and conventional tubing may also be used to feed motive fluid 144 into the motive manifolds 114.

It would be understood that while FIG. 1 illustrates a system using two wells, one a service well which is a horizontal lateral and the other a vertical or near vertical producer well, the present disclosure could be operated and/or designed using a single well. In this example of a single well design, there can be a tubing and packer completion in the vertical or near vertical section of the single well, followed by a horizontal lateral wellbore. Below the packer, in the horizontal portion of the wellbore would exist the same inflow and motive manifold configuration as seen in FIG. 1 with the exception that the initial inflow and motive manifold coupling would be at the end or "toe" of the horizontal lateral and subsequent couplings would travel back in the direction of the packer. Motive fluid would be injected from a surface compressor down the vertical well annulus, cross over into an additional annular pipe below the packer which would encase the same piping configuration as existing in the current FIG. 1. The motive fluid would then travel to the end of the horizontal lateral, make a U turn and enter the initial and then subsequent inflow and motive manifold couplings as contemplated in the two well design. Nature gas and motive fluid would be conveyed through the system as before described and be returned to the surface through the inside of the tubing in the vertical or near vertical section of the single wellbore.

Figure 2A:
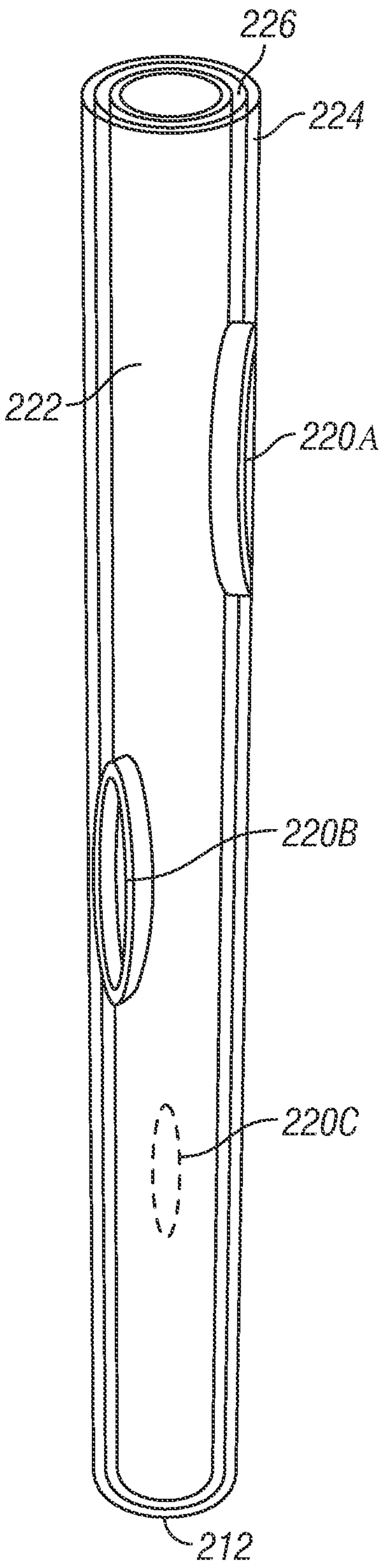
FIG. 2A is a side view of an inflow manifold that can be utilized with a low-pressure natural gas harvesting system.

FIG. 2A is a side view illustration of an inflow manifold 212, which has multiple inflow ports 220 to allow for natural gas to move into the system from an abandoned, near abandoned, or low producing natural gas or other fluid deposit. The inflow manifold may have an outer concentric tube 224 that is connected to an inner concentric tube 222 by annular space 226 and inflow connectors shown in FIG. 2B. The inflow connectors may aid in defining the annular space 226, which is hollow and exists between the inner concentric tube 222 and outer concentric tube 224. Natural gas enters through inflow ports 220 and then flows through the hollow center of the inner concentric tube 222, while motive fluid as shown in FIG. 1 can flow through the hollow annular space 226 that may be dimensioned and/or configured in such a way as to allow for motive fluid to move through without interacting with the natural gas or the abandoned, near abandoned, or low producing natural gas or other fluid deposit. The motive fluid is pumped through the system using a high-pressure compressor or other high-pressure fluid supply that pushes the motive fluid through the ejector manifold system as illustrated in FIG. 1. In at least one embodiment, the inflow manifold 212 is directly connected upstream of a motive manifold, which utilizes a Coandă effect surface to create a reduced localized pressure such that natural gas from the abandoned, near abandoned, or low producing natural gas or other fluid deposit flows into the inflow ports 220 and into the system. Once inside the inflow manifold 212, the natural gas moves towards the motive manifold through the hollow center space of the inner concentric tube 222.

Figure 2B:
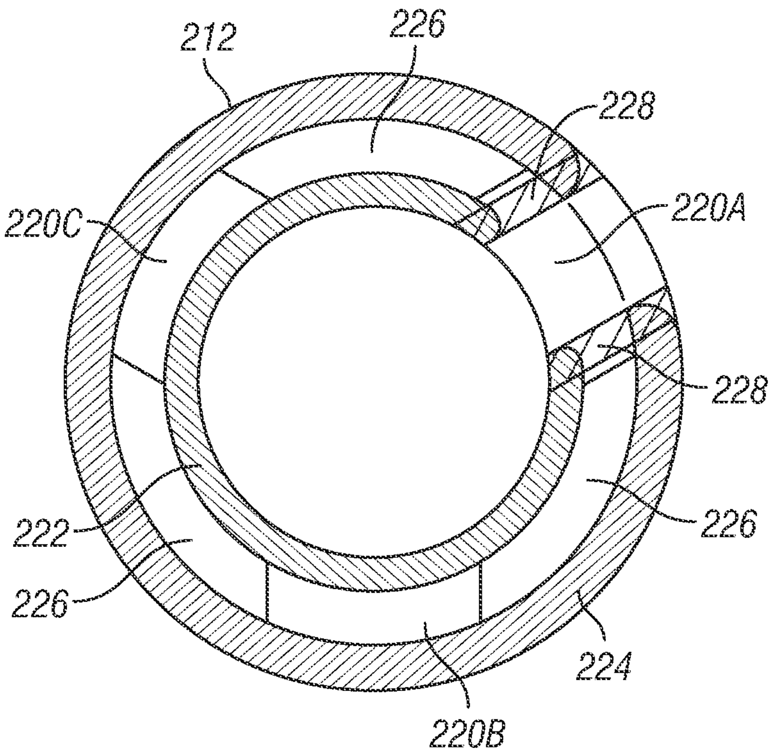
FIG. 2B is a cross-section view of an inflow manifold with inflow ports that can be utilized with a low-pressure natural gas harvesting system.

FIG. 2B is a cross-section illustration of the inflow manifold 212 that further reveals that each inflow port 220 extends through both the outer concentric tube 224 and the inner concentric tube 222 and are configured such that there is no mixing between the motive fluid and natural gas at this stage in an initial manifold set. However, when the inflow manifold is utilized in combination with a motive manifold in subsequent sets there may be a mixture of motive fluid and natural gas at the second and subsequent stages. The inflow ports 220 define a void that allows a fluid to flow from an area external of the inflow manifold 212 to an area inside the inflow manifold 212 to the inner concentric tube 222. The inflow ports 220 also connect the outer concentric tube 224 to the inner concentric tube 222 by inflow connectors 228 that extend through the annular space 226. The inflow connectors 228 prevent natural gas from passing to the outer concentric tube 224, by creating a wall that defines the void of the inflow ports 220. The inflow ports 220 are offset by 120 degrees from one another along the center axis and are separated laterally along the length of the inflow manifold 212. In some examples, the offset for the inflow ports 220 may be 90 degrees, 60 degrees, 45 degrees, 30 degrees, 150 degrees, 180 degrees, or other offsets as so desired based on calculations and/or the number of inflow ports 220, the amount of offset may range from 0 to 360 degrees, but preferably will not exceed 180 degrees. The amount of offset (by degrees) may be measured from the previous inflow port, meaning the first inflow port would be zero degrees, and the second inflow port would be at an offset of some degree value, there may be different offset for different configurations. Such as, but not limited to, a combination of a first offset of 30 degrees, with a second offset of 60 degrees. The annular space 226 may be dimensioned and/or configured in such a way as to allow for the motive fluid as shown in FIG. 1 to move through the annular space 226 without interacting with the natural gas or the abandoned, near abandoned, or low producing natural gas or other fluid deposit. The motive fluid can be pumped through the system using a high-pressure compressor or other fluid supply that pushes the motive fluid through the ejector manifold system. In at least one example, the inflow manifold 212 is directly connected upstream of a motive manifold, which utilizes a Coandă effect surface to create a low enough localized pressure that natural gas from the abandoned, near abandoned, or low producing natural gas or other fluid deposit moves into the inflow ports 220 and into the system. The inflow ports 220 define a void that allows a fluid to part from an area external of the inflow manifold 212 to an area inside the inflow manifold 212 to the inner concentric tube 222. Once inside the inflow manifold 212, the natural gas may move towards the motive manifold through the hollow center space of the inner concentric tube 222.

Figure 2C:
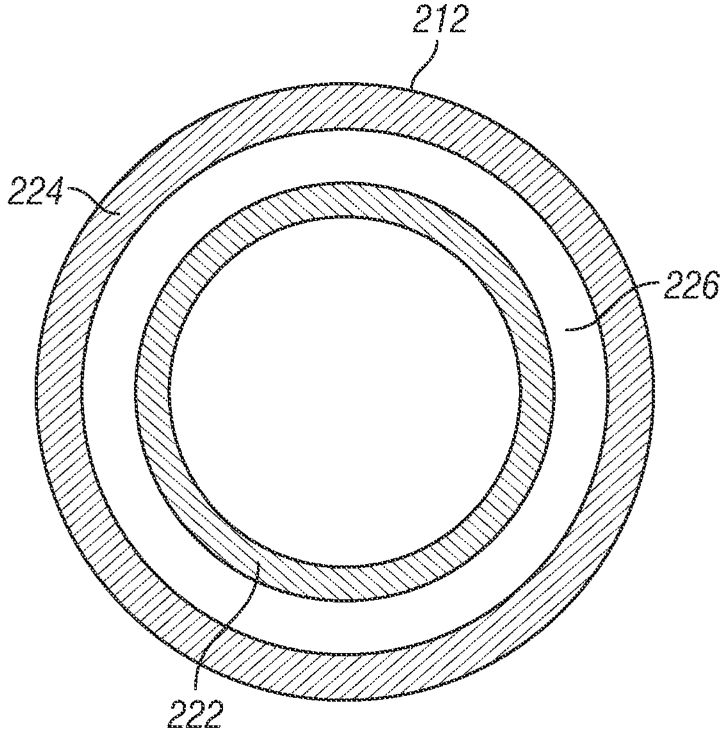
FIG. 2C is a side cross-section view of an inflow manifold with no inflow ports that can be utilized with a low-pressure natural gas harvesting system.

FIG. 2C illustrates a cross-section of a portion of inflow manifold 212 where there are no inflow ports 220. The outer concentric tube 224 may connect to the inner concentric tube 222 by annular space 226, which allows for motive fluid as shown in FIG. 1 to flow through. The inflow connectors as shown in FIG. 2B may aid in defining the annular space 226, which is hollow and exists between the inner concentric tube 222 and outer concentric tube 224. Natural gas flows through the hollow center of the inner concentric tube 222 while motive fluid as shown in FIG. 1 can flow through the hollow annular space 226 that may be dimensioned and/or configured in such a way as to allow for motive fluid to move through without interacting with the natural gas or the abandoned, near abandoned, or low producing natural gas or other fluid deposit. The motive fluid can be pumped through the system using a high-pressure compressor or other fluid supply that pushes the motive fluid through the ejector manifold system as shown in FIG. 1. In at least one embodiment, the inflow manifold 212 is directly connected upstream of a motive manifold, which utilizes a Coandă effect surface to create a reduced localized pressure such that natural gas from the abandoned, near abandoned, or low producing natural gas or other fluid deposit moves into the inflow ports 220 and into the system. Once inside the inflow manifold 212, the natural gas may flow towards the motive manifold through the hollow center space of the inner concentric tube 222.

FIGS. 2A, 2B, and 2C are collectively a depiction of the various components of an inflow manifold 212. With reference to FIGS. 2A, 2B, and 2C, the inflow manifold 212 allows for an abandoned, near abandoned, or low producing natural gas or other fluid deposit to release natural gas into the ejector manifold system as illustrated in FIG. 1. Inflow manifolds 212 can use multiple inflow ports 220A/220B/220C (collectively inflow ports 220) to maximize the natural gas input into the ejector manifold system. It would be understood that multiple inflow ports may be utilized ranging from 1-100 per inflow manifold, with the ports being offset from one another at various degrees, and additionally the orientation of the inflow ports may be changed to accommodate the appropriate flow for the particular application. For example, the inflow ports may be vertical (parallel to the flow within the inflow manifold), horizontal (perpendicular to the flow within the inflow manifold), or at some angle in between. The inflow manifold 212 may utilize a dual tube configuration characterized by an inner concentric tube 222, an outer concentric tube 224, and an annular space 226. The inner concentric tube 222 connects to the outer concentric tube 224 via the annular space 226 and inflow connectors 228. The inflow connectors 228 may aid in defining the annular space 226, which is hollow and exists between the inner concentric tube 222 and outer concentric tube 224. Natural gas flows through the hollow center of the inner concentric tube 222 while motive fluid as shown in FIG. 1 can flow through the hollow annular space 226 between the inner concentric tube 222 and outer concentric tube 224. The outer concentric tube 224 prevents the motive fluid from escaping into the natural gas reservoir. The inflow ports 220 extend through both the inner concentric tube 222 and outer concentric tube 224 via the inflow connectors 228, which also prevent motive fluid from mixing with the natural gas in the inflow manifold 212.

Figure 3D:
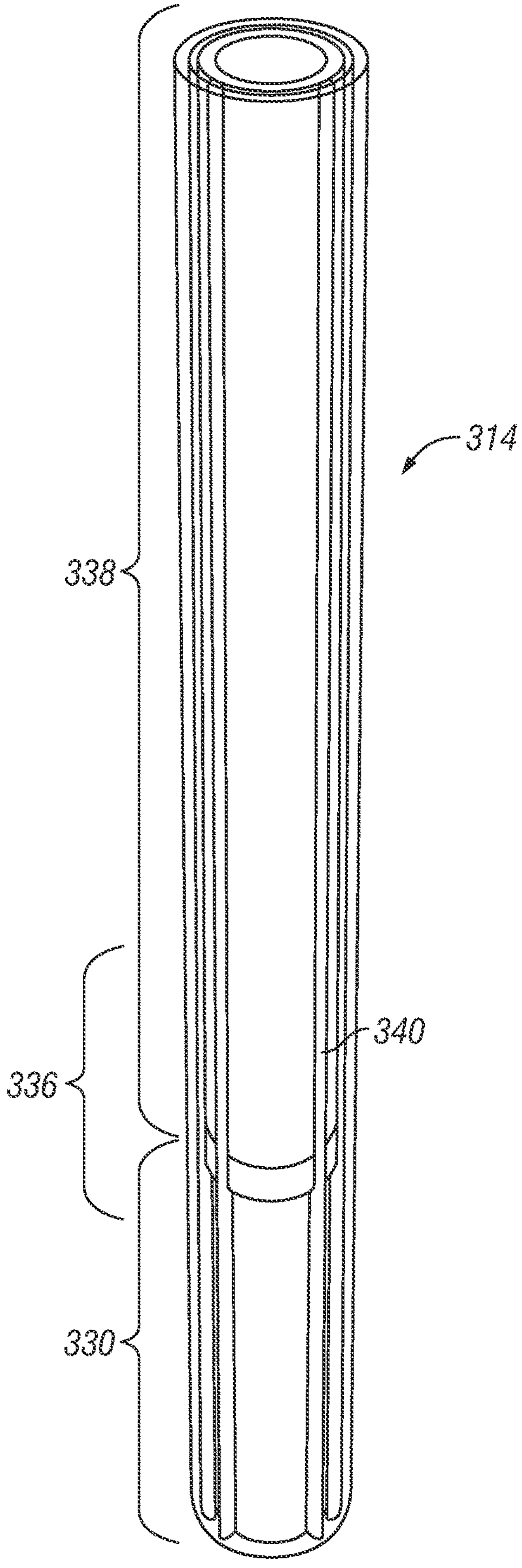
FIG. 3D is a transparent side view of a motive manifold that can be utilized with a low-pressure natural gas harvesting system.
Figure 3A:
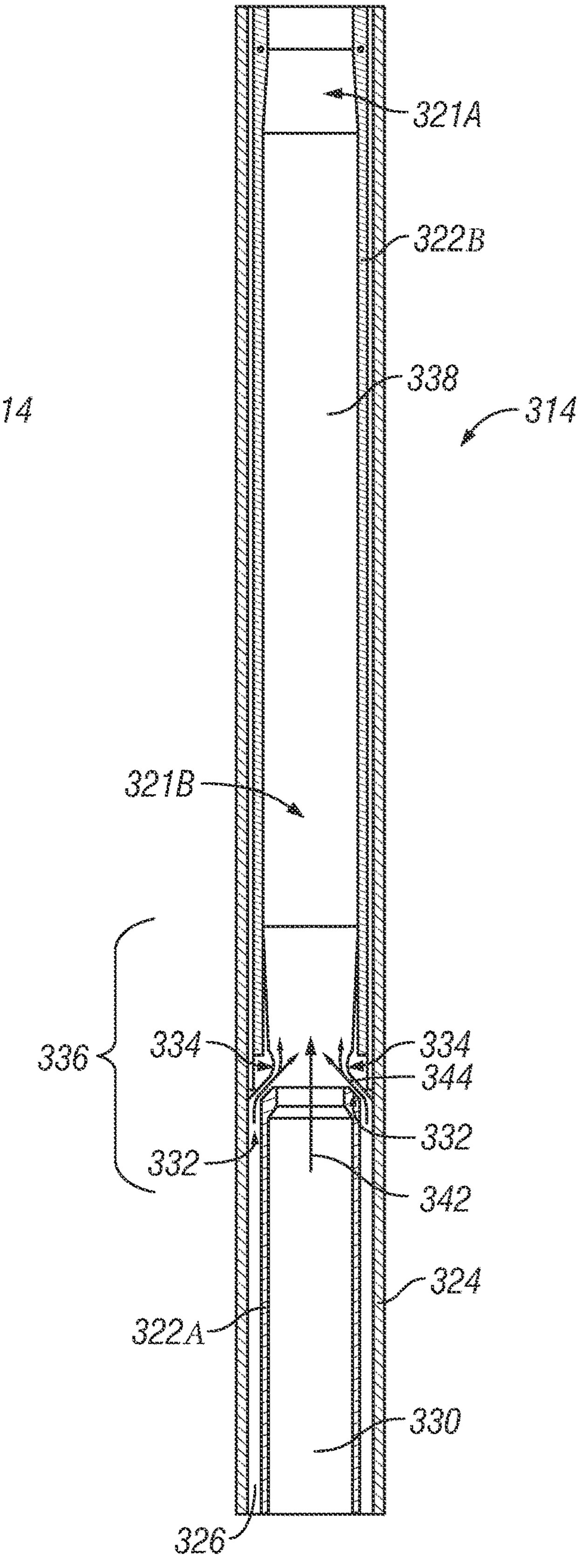
FIG. 3A is a side cross-section view of a motive manifold that can be utilized with a low pressure natural gas harvesting system.

FIGS. 3A, 3B, 3C and 3D are a collective depiction of the various components of a motive manifold 314. The motive manifold 314 encourages abandoned, near abandoned, or low producing natural gas or other fluid deposit to release natural gas into the ejector manifold system as shown in FIG. 1. In at least one example, the release of natural gas may be a pulling action or effect into the ejector manifold system. Motive manifolds 314 utilize a Coandă effect surface 334, as shown in FIG. 3A, to maximize the natural gas input into the ejector manifold system by generating a reduced pressure effect that encourages higher pressure natural gas from an abandoned, near abandoned, or low producing natural gas or other fluid deposit to move into the ejector manifold system as shown in FIG. 1. The motive manifold 314 may utilize a dual tube configuration characterized by an inner concentric tube 322 (illustrated in FIGS. 3A, 3B, and 3C, also marked as 322A and 322B, where 322B has a larger inner and outer diameter than 322A to allow for connections to other tubing, manifolds, or modules and to reduce the cross-section annular space 326, between the inner concentric tube 322 and outer concentric tube 324 of the upper section of the motive manifold 338 to encourage motive fluid into the Coandă motive module 336), an outer concentric tube 324, and an annular space 326.

Figure 3B:
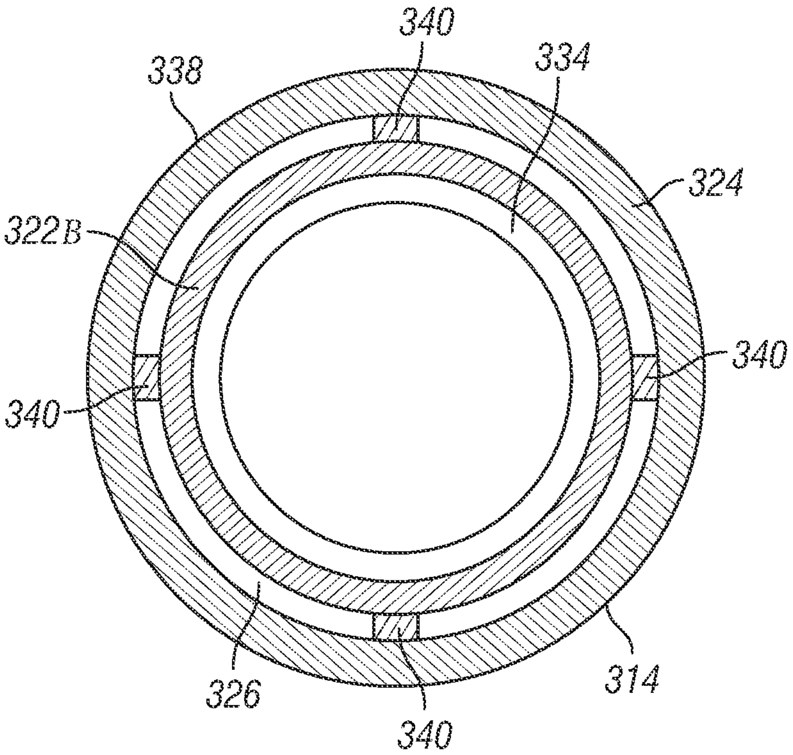
FIG. 3B is a cross-section view of the upper section of the motive manifold that can be utilized with a low-pressure natural gas harvesting system.
Figure 3C:
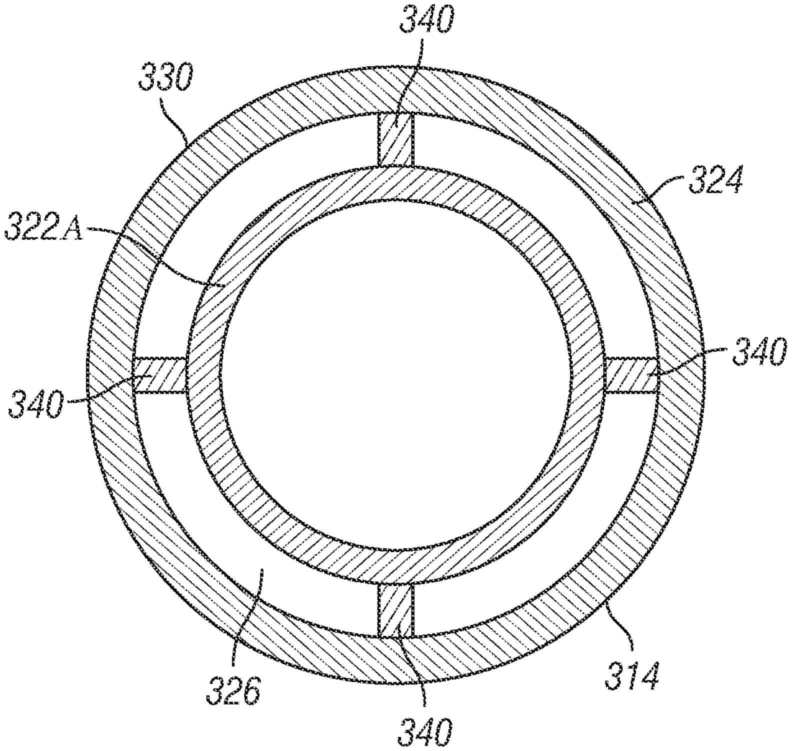
FIG. 3C is a cross-section view of the lower section of the motive manifold that can be utilized with a low-pressure natural gas harvesting system.

In at least one example, the inner concentric tube 322 connects to the outer concentric tube 324 via the annular space 326 and splines 340 as shown in FIGS. 3B, 3C & 3D. The splines may aid in defining the annular space 326, which is hollow and exists between the inner concentric tube 322 and outer concentric tube 324. Natural gas flows through the hollow center of the inner concentric tube 322 while motive fluid as shown in FIG. 1 can flow through the hollow annular space 326 that may be configured in such a way as to allow for motive fluid to move through without interacting with the natural gas or the abandoned, near abandoned, or low producing natural gas or other fluid deposit. The natural gas may flow into a lower concentric tube of the lower section 330 of the motive manifold 314 from an adjacent connecting inflow manifold while the motive fluid moves through the annular space 326 of a lower section of the motive manifold 330. When the motive fluid reaches a reduction in the cross-sectional area of annular space 326 in the upper section of the motive manifold 338, the motive fluid may move into a Coandă motive module 336 by way of a motive fluid entrance 332. The motive fluid then can flow over the rounded Coandă effect surface 334, which generates the reduced pressure effect that pulls or pushes natural gas into the system in an attached inflow manifold. Because a jet of fluid naturally entrains with its surroundings, a surface brought next to the jet limits the amount of entrainment and ambient pressure exerted on the jet in that area and subsequently creates an imbalance in momentum. In balancing the momentum, a pressure differential across the jet is created, which causes the fluid to move towards the surface. The jet will bend itself along the surface, even if the surface is curved. This phenomenon, called the "Coandă effect," is much more pronounced near curved surfaces. The jet may be created by motive fluid entrance 332, wherein the motive fluid can quickly flow into the Coandă motive module 336 and move over the curved Coandă effect surface 334. Once the motive fluid flows over the Coandă effect surface 334, reduced pressure regions form at or near where the motive fluid meets the Coandă effect surface 334, thereby creating a pressure differential that encourages natural gas, and mixed natural gas and motive fluid if the Coandă effect surface 334 is not in the initial inflow and motive manifold coupling, to allow fluid movement 342 into the Coandă motive module 336 and entrain with the newly added motive fluid. The motive manifold 314 may utilize a dual tube configuration characterized by an inner concentric tube 322, an outer concentric tube, and/or an annular space in order to facilitate movement through the Coandă motive module 336.

The jet may be created by the motive fluid entrance 332, wherein the motive fluid can quickly flow into the Coandă motive module 336 and move over the curved Coandă effect surface 334. Once the motive fluid flows over the Coandă effect surface 334, reduced pressure regions form at or near where the motive fluid meets the Coandă effect surface 334, thereby creating a reduced pressure that encourages natural gas and mixed fluid to move into the motive manifold 314 and entrain with the newly added motive fluid. The first motive manifold in the ejector manifold system, or apparatus may receive both natural gas and a motive fluid, but would not allow them to mix until their combination in the Coandă motive module 336, while subsequent motive manifolds may receive a mixture of natural gas and a motive fluid that is further mixed at the Coandă effect surface 334 with additional motive fluid. The motive fluid then may entrain or mix with the natural gas and continues to move through the upper section of the motive manifold 338. The mixture can then continue to move through the ejector manifold system as shown in FIG. 1. Multiple motive manifolds 314 can work in combination, utilizing the Coandă effect to generate a reduced pressure to engage with the fluid stored within the abandoned, near abandoned, or low producing natural gas or other fluid deposit. Similarly, they may also be used to boost a mixed fluid through the ejector manifold system. Once the natural gas mixes with the motive fluid in the motive manifold 314, the mixture can continue through the ejector manifold system as shown in FIG. 1 via the hollow space of an inner concentric tube located in an inflow manifold as shown in FIG. 2A or motive manifold 314 or through one or more pipes as shown in FIG. 1. Motive fluid may continue to move through the Coandă motive module 336 and continue to combine with the mixed fluid in order to further push or pull or "boost" the mixture to a production well.

FIG. 3A illustrates a motive manifold 314 in which natural gas, or natural gas mixed with motive fluid if it is not an initial motive manifold 314, enters the inner concentric tube in the lower section of the motive manifold 330 directly from a connected inflow manifold. The natural gas moves through the central space in the inner concentric tube 322A/322B (collectively referenced as inner concentric tube 322). Where the inner concentric tube can have two different inside and/or outside diameters illustrated at the points 322A and 322B that allow for the coupling of the inner concentric tube to other tubes, manifolds, or modules. The natural gas then enters a Coandă motive module 336, which may be cylindrical in nature and encompass the size of the inner concentric tube 322, encounters the motive fluid that enters through a motive fluid entrance 332 and moves over the Coandă effect surface 334. The motive fluid can be pumped through the system using a high-pressure compressor or other fluid supply that pushes the motive fluid through the ejector manifold system as shown in FIG. 1. Natural gas flows through the hollow center of the inner concentric tube 322 while motive fluid as shown in FIG. 1 can flow through the hollow annular space 326 that may be dimensioned and/or configured in such a way as to allow for motive fluid to move through without interacting with the natural gas or the abandoned, near abandoned, or low producing natural gas or other fluid deposit. Splines 340 as shown in FIGS. 3B, 3C & FIG. 3D may aid in defining the annular space 326, which is hollow and exists between the inner concentric tube 322 and outer concentric tube 324 of the lower section of the motive manifold 330 and the upper section of the motive manifold 338. Motive fluid enters the motive fluid entrance 332 due to a reduction in the cross-sectional area of the annular space 326 of the upper section of the motive manifold 338. The cross sectional area of the annular space 326 changes between the lower section of the motive manifold 330 and the upper section of the motive manifold 338, and reduces in close proximity to the motive fluid entrance 332, allowing there to be a pressure increase in the annular space 326 below the motive fluid entrance 332 and thereby creating a driving effect or action 344 on the motive fluid through the motive fluid entrance 332. Once the motive fluid flows over the Coandă effect surface 334, reduced pressure regions form at or near where the motive fluid meets the Coandă effect surface 334, thereby creating a reduced pressure that encourages natural gas, and mixed natural gas and motive fluid if the Coandă effect surface 334 is not in the initial inflow and motive manifold coupling, to move 342 into the Coandă motive module 336 and entrain with the newly added motive fluid.

The motive fluid moving over the Coandă effect surface 334 generates a reduced pressure effect that extends into the inflow manifold upstream and lowers the local pressure, causing the natural gas (and natural gas/motive fluid mixture in manifold systems subsequent to the initial inflow/motive manifold pair) to pull or be pushed towards the motive fluid in the Coandă motive module 336. The motive fluid and natural gas may begin to mix and entrain together in the Coandă motive module 336 and continue to move and mix into the upper section of the motive manifold 338. The mixture then may continue to move through the ejector manifold system, which may contain multiple iterations of an inflow manifold directly connected upstream to a motive manifold 314, until it reaches a production well.

FIG. 3B shows a cross-section illustration of the upper section of the motive manifold 338. The motive manifold 314 may utilize a dual tube configuration characterized by an inner concentric tube 322, an outer concentric tube 324, and an annular space 326. In at least one example, the inner concentric tube 322 sits within the outer concentric tube 324 with annular space 326 between them and splines as shown in FIGS. 3A, 3B and 3D providing support. The splines 340 may aid in defining the annular space 326, which is hollow and exists between the inner concentric tube 322 and outer concentric tube 324. Natural gas flows through the hollow center of the inner concentric tube 322 while motive fluid as shown in FIG. 1 can flow through the hollow annular space 326 that may be dimensioned and/or configured in such a way as to allow for motive fluid to move through without interacting with the natural gas or the abandoned, near abandoned, or low producing natural gas or other fluid deposit. In some examples, if more than one motive manifold 314 is utilized within a system, the inner concentric tube 322A in the lower section of motive manifold 330 may contain a mixture of natural gas and motive fluid, that is further mixed with additional motive fluid in the Coandă motive module 336. The inside and/or outside diameter of the inner concentric tube 322B in the upper section of the motive manifold 338 may be increased to encourage motive fluid flow into the motive fluid entrance 332 of the Coandă motive module 336. The motive fluid may move from conventional piping or an inflow manifold, which then guides the motive fluid into the motive manifold 314 or the Coandă motive module 336 via a motive fluid entrance 332. Natural gas may flow into the motive manifold 314 through the center of the inner concentric tube 322 of the lower section of the motive manifold 330 by way of a connected inflow manifold or conventional piping. The natural gas may then flow into the motive manifold 314 due to the presence of the Coandă motive module 336. The Coandă motive module 336 comprises of the motive fluid entrance 332 and the Coandă effect surface 334. Motive fluid may flow into the Coandă motive module through the motive fluid entrance 332 and over the Coandă effect surface 334, generating an area of reduced pressure causing the natural gas to move towards the motive fluid in the Coandă motive module 336. Following the introduction of motive fluid into the Coandă motive module 336, the natural gas and motive fluid can mix or entrain and move through the upper section of the motive manifold 338, which may then connect to another motive manifold 314, an inflow manifold, or conventional piping. The mixture can then move through the remainder of the ejector manifold system that may contain multiple iterations of the inflow and motive manifold coupling until the mixture reaches a production well.

FIG. 3C shows a cross-section illustration of the lower section of the motive manifold 330. The motive manifold 314 may utilize a dual tube configuration characterized by an inner concentric tube 322, an outer concentric tube 324, and an annular space 326. In at least one example, the inner concentric tube 322 sits within the outer concentric tube 324 and connected to one another through the annular space 326 and splines 340. The splines 340 may aid in defining the annular space 326, which is hollow and exists between the inner concentric tube 322 and outer concentric tube 324. Natural gas flows through the hollow center of the inner concentric tube 322 while motive fluid as shown in FIG. 1 can flow through the hollow annular space 326 that may be dimensioned and/or configured in such a way as to allow for motive fluid to move through without interacting with the natural gas or the abandoned, near abandoned, or low producing natural gas or other fluid deposit. The motive fluid may move from conventional piping or an inflow manifold, which then guides the motive fluid into the motive manifold 314 or the Coandă motive module 336 via a motive fluid entrance 332. Natural gas may flow into the motive manifold 314 through the center of the inner concentric tube 322A of the lower section of the motive manifold 330 by way of a connected inflow manifold or conventional piping. The natural gas may flow into the motive manifold 314 due to the presence of the Coandă motive module 336. Motive fluid moves into the Coandă motive module 336 through the motive fluid entrance 332 and over the Coandă surface 334, generating an area of reduced pressure causing the natural gas to move towards the motive fluid in the Coandă motive module 336. Following the introduction of motive fluid into the channel containing the natural gas, the natural gas and motive fluid can mix or entrain and move through the upper section of the motive manifold 338, which then may connect to another motive manifold 314, an inflow manifold, or conventional piping. The mixture can then move through the remainder of the ejector manifold system that may contain multiple iterations of the inflow and motive manifold coupling until the mixture reaches a production well.

FIG. 3D is a perspective view illustration of the motive manifold 314. The motive manifold 314 can have an upper section of the motive manifold 338 and a lower section of the motive manifold 330. Each portion of the concentric tubes in the upper and lower sections of the motive manifold may have their own diameter, threading, and/or coupling that allow for interfacing with various components of a natural gas harvesting system. An outer tube and the inner concentric tube(s) can be separated by splines 340 that provide support to the outer tube from the inner tube. In some examples, splines 340 may be configured to allow the inner tube(s) to be fitted to the outer tube(s). In other examples, splines 340 may also assist in directing fluid between the inner tube(s) and the outer tube(s).

Figure 4:
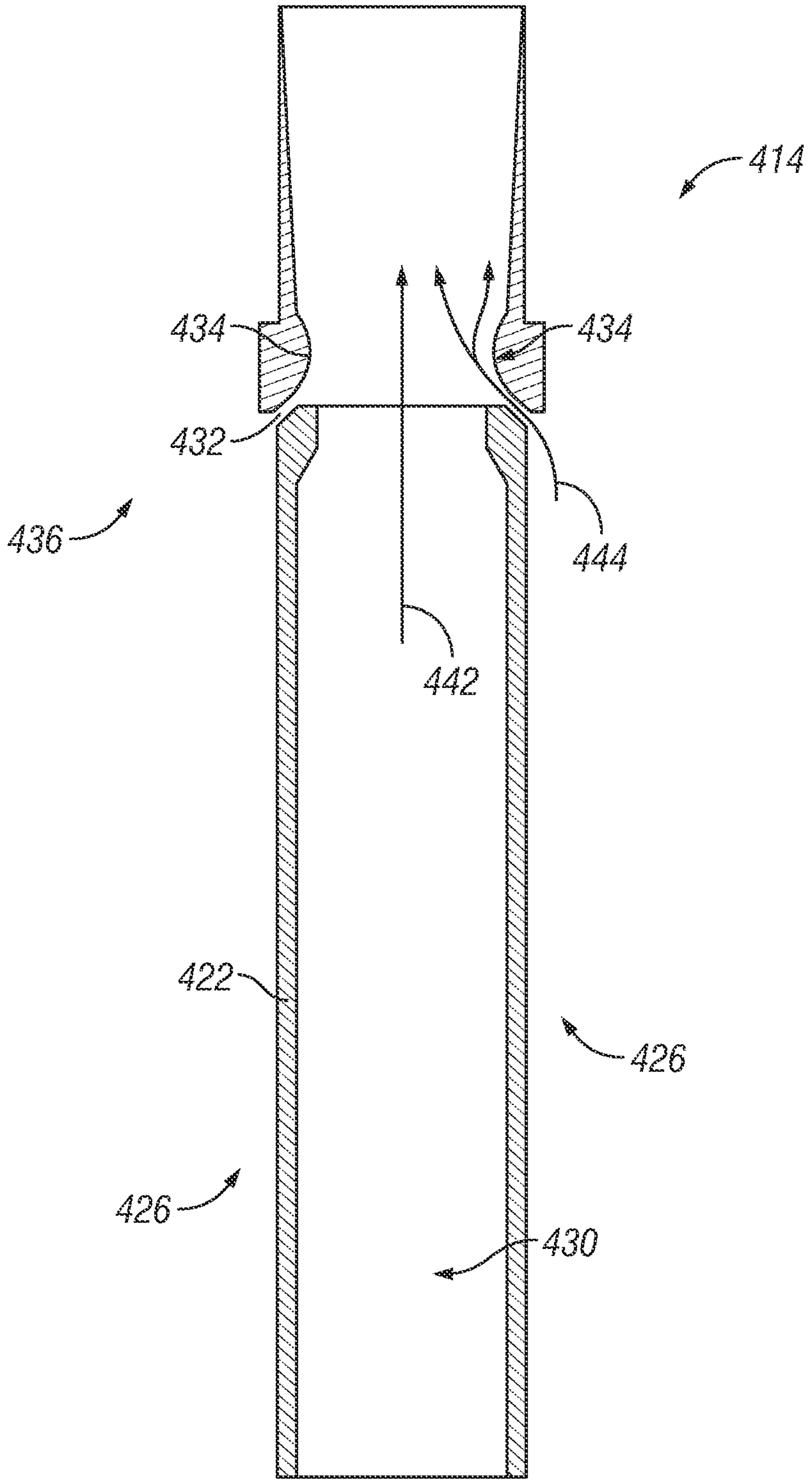
FIG. 4 is a side cross-section view of a segment of a motive manifold that focuses on the Coandă motive_module that can be utilized with a low-pressure natural gas harvesting system.

FIG. 4 is an enhanced perspective view illustration of the motive manifold 414. The Coandă motive module 436 specifically encourages an abandoned, near abandoned, or low producing natural gas or other fluid deposit to release natural gas into the ejector manifold system as shown in FIG. 1. Coandă motive modules 436 utilize a Coandă effect surface 434 to maximize the natural gas input into the ejector manifold system by generating a reduced pressure effect that encourages higher pressure natural gas from the natural gas reserve to move into the ejector manifold system. This phenomenon, called the "Coandă effect," is much more pronounced near curved surfaces.

Because a jet of fluid naturally entrains with its surroundings, a surface brought next to the jet limits the amount of entrainment and ambient pressure exerted on the jet in that area and subsequently creates an imbalance in momentum. In balancing the momentum, a pressure differential across the jet is created, which causes the fluid to move towards the surface. The jet will bend itself along the surface, even if the surface is curved. The jet may be created by motive fluid entrance 432, wherein the motive fluid can quickly flow into the Coandă motive module 436 and move over the curved Coandă effect surface 434. Once the motive fluid flows over the Coandă effect surface 434, reduced pressure regions form at or near where the motive fluid meets the Coandă effect surface 434, thereby creating a pressure differential that encourages natural gas, and mixed natural gas and motive fluid if the Coandă effect surface 434 is not in the initial inflow and motive manifold coupling, to move 442 into the Coandă motive module 436 and entrain with the newly added motive fluid. The motive manifold 414 may utilize a dual tube configuration characterized by an inner concentric tube 422, an outer concentric tube, and/or an annular space in order to facilitate movement through the Coandă motive module 436.

The jet may be created by motive fluid entrance 432, wherein the motive fluid can quickly flow into the Coandă motive module 436 and move over the curved Coandă effect surface 434. The cross sectional area of the annular space 426 changes between the lower section of the motive manifold 430 and the upper section of the motive manifold, and reduces in close proximity to the motive fluid entrance 432, allowing there to be a pressure increase in the annular space 426 below the motive fluid entrance 432 and thereby creating a driving effect or action 444 on the motive fluid through the motive fluid entrance 432. Once the motive fluid flows over the Coandă effect surface 434, reduced pressure regions form at or near where the motive fluid meets the Coandă effect surface 434, thereby creating a reduced pressure that encourages natural gas, and mixed natural gas and motive fluid if the Coandă effect surface 434 is not in the initial inflow and motive manifold coupling, to move 442 into the Coandă motive module 436 and entrain with the newly added motive fluid. The motive manifold 414 may utilize a dual tube configuration characterized by an inner concentric tube 422, an outer concentric tube, and/or an annular space 426 in order to facilitate movement through the Coandă motive module 436.

Motive fluid flows outside the inner concentric tube 422 in an annular space and enters the Coandă motive module 436 at the motive manifold entrance 432. The flow of motive fluid is encouraged in part by a decrease in cross-sectional area of the annular space outside and downstream of the Coandă motive module 436. Once inside the Coandă motive module 436, the motive fluid moves over the Coandă effect surface 434 to generate a reduced pressure effect that pulls the natural gas through the motive manifold 414. Once through the Coandă motive module 436, natural gas and motive fluid begin to entrain and mix as it moves throughout the upper section of the motive manifold.

While this disclosure has been particularly shown and described with reference to preferred embodiments, it will be understood by those skilled in the art that various changes in form and detail may be made therein without departing from the spirit and scope of the invention. The investors expect skilled artisans to employ such variations as appropriate, and the inventors do not intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments but should be defined only in accordance with any claims and their equivalents issuing from this disclosure. Furthermore, the above advantages and features are provided in described embodiments but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called filed. Further, a description of a technology as background information is not to be construed as an admission that certain technology is prior art to any embodiments in this disclosure. Neither is the "Brief Summary" to be considered as a characterization of the embodiments(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of the such claims shall be considered on their own merits in light of this disclosure but should not be constrained by the headings set forth herein.

I claim:

1. A system for low-pressure natural gas harvesting comprising:

a first well in fluid connection with a natural gas reservoir;

a compressor connected to the first well;

a motive fluid moved by the actions of the compressor from the first well to the natural gas reservoir and through at least one inflow manifold; and at least one motive manifold receiving the natural gas from the at least one inflow manifold, and utilizing a Coandă surface to create a reduced pressure in the at least one motive manifold that pulls natural gas into the at least one inflow manifold through at least one inflow port;

wherein an annular space that connects an inner concentric tube within the at least one inflow manifold and an outer concentric tube that encases both the inner concentric tube and the at least one inflow manifold, and the annular space is configured such that the motive fluid can flow through said annular space;

wherein the at least one inflow manifold comprises three inflow ports that extend through both the inner concentric tube and outer concentric tube and each inflow port is separated laterally along the length of the at least one inflow manifold by 120 degrees along the center axis;

wherein the natural gas mixes with the motive fluid and flows to the first well or at least one production well.

2. The system of claim 1, wherein the at least one motive manifold further comprises of at least one Coandă motive module, which is configured to receive the motive fluid and comprises the Coandă surface that separates the motive manifold into a lower section of the motive manifold that pulls in the natural gas and an upper section of the motive manifold that allows the mixing of the natural gas and motive fluid.

3. The system of claim 2, further comprising an annular space that connects an inner concentric tube within the at least one motive manifold and an outer concentric tube that encases both the inner concentric tube the at least one motive manifold and the annular space is configured such that the motive fluid can flow through said annular space.

4. The system of claim 3, further comprising a reduction of the annular space between the inner concentric tube and the outer concentric tube of the upper section of the motive manifold of the at least one motive manifold and said reduction is dimensioned such that motive fluid is forced to flow into the Coandă motive module.

5. The system of claim 1, wherein the at least one inflow manifold further comprises of three inflow ports separated laterally along the length of the inflow manifold by 120 degrees along the center axis.

6. A system for low pressure natural gas harvesting comprising:

a first well in fluid connection with a natural gas reservoir through a horizontal lateral wellbore;

a second well in fluid connection with the natural gas reservoir through a vertical or near-vertical wellbore;

a compressor connected to the first well;

a motive fluid moved by the actions of the compressor from the first well to the natural gas reservoir and through at least one inflow manifold in the horizontal lateral wellbore; and at least one motive manifold receiving the natural gas from the at least one inflow manifold, and utilizing a Coandă effect surface to create a reduced pressure in the at least one motive manifold in the horizontal lateral wellbore, and the at least one inflow manifold utilizes the reduced pressure effect caused by the Coandă effect surface in the at least one motive manifold to pull natural gas into the at least one inflow manifold through at least one inflow port;

wherein an annular space that connects an inner concentric tube within the at least one inflow manifold and an outer concentric tube that encases both the inner concentric tube and the at least one inflow manifold, and the annular space is configured such that the motive fluid can flow through said annular space;

wherein the at least one inflow manifold comprises three inflow ports that extend through both the inner concentric tube and outer concentric tube and each inflow port is separated laterally along the length of the at least one inflow manifold by 120 degrees along the center axis;

wherein the natural gas moves from the horizontal lateral wellbore through a subsurface connection or pathway to the vertical or near-vertical wellbore that is connected to the first compressor or an auxiliary compressor.

7. The system of claim 6, wherein the at least one motive manifold further comprises of at least one Coandă motive module, which is configured to receive the motive fluid and comprises the Coandă effect surface that separates the motive manifold into a lower section of the motive manifold that pulls in the natural gas and an upper section of the motive manifold that allows the mixing of the natural gas and motive fluid.

8. The system of claim 6, further comprising an annular space between an inner concentric tube within the at least one motive manifold and an outer concentric tube that encases both the inner concentric tube and the at least one motive manifold and the annular space is configured such that the motive fluid can flow through said annular space.

9. The system of claim 8, further comprising a reduction of the annular space between the inner concentric tube and the outer concentric tube of the upper section of the motive manifold of the at least one motive manifold and said reduction is dimensioned such that motive fluid is forced to flow into the Coandă motive module.

10. The system of claim 6, in which the at least one inflow manifold has three inflow ports separated laterally along the length of the inflow manifold by 120 degrees along the center axis.

11. A method for low pressure natural gas harvesting comprising:

pressurizing a first length of tubing containing a motive fluid with a compressor;

causing the motive fluid to flow from a first well through the first length of tubing to a second length of tubing within a natural gas reservoir;

flowing the motive fluid through at least one inflow manifold that is within the second length of tubing;

generating a reduced pressure effect in the at least one inflow manifold when the motive fluid passes over a Coandă effect surface of at least one motive manifold;

wherein the motive fluid flows through an annular space that connects and inner concentric tube within the at least one inflow manifold and an outer concentric tube that encases both the inner concentric tube and the at least one inflow manifold, and the annular space is configured such that the motive fluid can flow through said annular space;

wherein the at least one inflow manifold comprises three inflow ports that extend through both the inner concentric tube and outer concentric tube and each inflow port is separated laterally along the length of the at least one inflow manifold by 120 degrees along the center axis;

mixing the motive fluid with a first amount of natural gas from the natural gas reservoir in the at least one motive manifold; and pushing the mixed fluid into a third length of tubing that concludes at the first well or at least one production well.

12. The method of claim 11, wherein the at least one motive manifold comprises of at least one Coandă motive module that receives the motive fluid that passes over the Coandă effect surface.

13. The method of claim 11, wherein the motive fluid flows through an annular space between an inner concentric tube within the at least one motive manifold and an outer concentric tube that encases both the inner concentric tube and the at least one motive manifold and the annular space is configured such that the motive fluid can flow through said annular space.

14. The method of claim 13, wherein the motive fluid flows through a reduction of the annular space between the inner concentric tube and the outer concentric tube of the upper section of the motive manifold of the at least one motive manifold and said reduction is dimensioned such that the motive fluid flows into the Coandă motive module.

15. The method of claim 11, wherein the at least one inflow manifold comprises of at least one inflow port through which the natural gas moves through from the natural gas reservoir to access the at least one inflow manifold.

16. The method of claim 11, wherein the at least one inflow manifold has three inflow ports separated laterally along the length of the inflow manifold by 120 degrees along the center axis.

17. The method of claim 11, wherein the natural gas and motive fluid move through a horizontal lateral wellbore that is connected to a vertical or near-vertical wellbore, which moves the natural gas and motive fluid to the first well or the at least one production well.

* * * * *